US006016151A

United States Patent [19]
Lin

[11] Patent Number: 6,016,151
[45] Date of Patent: Jan. 18, 2000

[54] 3D TRIANGLE RENDERING BY TEXTURE HARDWARE AND COLOR SOFTWARE USING SIMULTANEOUS TRIANGLE-WALKING AND INTERPOLATION FOR PARALLEL OPERATION

[75] Inventor: Tao Lin, Fremont, Calif.

[73] Assignee: NeoMagic Corp., Santa Clara, Calif.

[21] Appl. No.: 08/928,291

[22] Filed: Sep. 12, 1997

[51] Int. Cl.[7] .................................................. G06T 15/60
[52] U.S. Cl. ........................ 345/430; 345/441; 345/422; 345/502; 345/503; 345/511
[58] Field of Search .................................. 345/430, 511, 345/422, 502, 503, 441

[56] References Cited

U.S. PATENT DOCUMENTS

| 5,097,427 | 3/1992 | Lathrop et al. | 395/130 |
| 5,388,206 | 2/1995 | Poulton et al. | 395/163 |
| 5,469,535 | 11/1995 | Jarvis et al. | 395/130 |
| 5,533,140 | 7/1996 | Sirat et al. | 382/108 |
| 5,544,292 | 8/1996 | Winser | 395/130 |
| 5,548,709 | 8/1996 | Hannah et al. | 395/164 |
| 5,621,867 | 4/1997 | Murata et al. | 395/130 |
| 5,623,310 | 4/1997 | Kim | 348/394 |
| 5,835,096 | 11/1998 | Baldwin | 345/430 |
| 5,856,829 | 1/1999 | Gray, III et al. | 345/422 |
| 5,877,779 | 3/1999 | Goldberg et al. | 345/511 |

OTHER PUBLICATIONS

Foley et al. "Computer Graphics: Principle and Practice", Second Edition, pp. 741–743, 1996.

Primary Examiner—Mark R. Powell
Assistant Examiner—Kimbinh T. Nguyen
Attorney, Agent, or Firm—Stuart T. Auvinen

[57] ABSTRACT

A 3D graphics accelerator operates in parallel with a host central processing unit (CPU). Software executing on the host CPU performs transformation and lighting operations on 3D-object primitives such as triangles, and generates gradients across the triangle for red, green, blue, Z-depth, alpha, fog, and specular color components. The gradients for texture attributes are also generated and sent to the graphics accelerator. Both the graphics accelerator and the CPU software perform triangle edge and span walking in synchronization to each other. The CPU software walks the triangle to interpolate non-texture color and depth attributes, while the graphics accelerator walks the triangle to interpolate texture attributes. The graphics accelerator performs a non-linear perspective correction and reads a texture pixel from a texture map. The texture pixel is combined with a color pixel that is received from the CPU software interpolation of non-texture attributes. Once the texture pixel from the graphics accelerator and the color pixel from the CPU software are sent to a blender in the graphics accelerator, both continue to interpolate the next pixel in the horizontal-line span, or move to a pixel in the next span. Both the CPU software and the graphics accelerator interpolate the same pixel at the same time. Using both the CPU and the graphics accelerator improves performance since both operate in parallel on the same pixel at the critical interpolation bottleneck.

18 Claims, 7 Drawing Sheets

3D TRIANGLE RENDERING BY TEXTURE HARDWARE AND COLOR SOFTWARE USING SIMULTANEOUS TRIANGLE-WALKING AND INTERPOLATION FOR PARALLEL OPERATION

BACKGROUND OF THE INVENTION—FIELD OF THE INVENTION

This invention relates to 3-D graphics systems, and more particularly to parallel processing of non-texture and texture attributes of pixels with a 3-D accelerator.

BACKGROUND OF THE INVENTION—DESCRIPTION OF THE RELATED ART

Personal computer (PC) systems have become enormously popular. Portable notebook or laptop PC's have traditionally had lower-performance components than desktop PC's. In particular, these notebook PC's have suffered from lower-quality graphics while desktop PC's are more likely to have better graphics.

An extremely compute-intensive use of a PC is the manipulation and rendering of three-dimensional (3D) objects for display on a two-dimensional display screen. Yet 3D-graphics applications are becoming more popular with computer users and should continue to gain popularity as higher-performance computers emerge.

Three-dimensional objects or surfaces are approximated as connected polygons, usually triangles. Greater detail can be obtained by using a greater number of smaller triangles to approximate the object or surface. Distances and angles from a viewer to these objects are calculated and used to determine which surfaces to display and which surfaces to hide. Surfaces farther away from the viewer or at a high angle to the viewer can be shaded or shown in less detail than closer, flat surfaces.

The image displayed on the computer's display screen is generated from the position, color, lighting, and texture of the triangles. The three vertexes and the color, depth, and texture attributes of each vertex are stored in a memory buffer. This buffer in the computer's main memory is sometimes known as the "3D-execute buffer". Each triangle being displayed is divided into lines of pixels that are stored in a frame buffer and then scanned to the display screen. However, the triangle in the 3D-execute buffer directly specifies the color, depth, and texture attributes of only three points—the three vertices of the triangle. The color, depth, and texture attributes of pixels within the triangle must be calculated from the colors of the three vertices. Thus a large amount of computational work is needed to interpolate from the three vertices the attributes of the many pixels within the triangle.

3D-Execute Buffer Stores Color, Texture of Vertices

FIG. 1A is a diagram of a triangle that is a drawing primitive of a 3D object or surface. Imaginary pixels are located at the three vertices (0,1,2) of the triangle. These are imaginary pixels rather than actual pixels because they do not necessarily fall exactly at an integer x,y coordinate of a pixel on the display screen. From the colors of the imaginary pixels at the vertices, the color of any pixel within the triangle can be calculated.

The color of a pixel is designated by the intensity of the red, green, and blue (RGB) color components. Each color component may be encoded as a multi-bit binary value. Other components, such as depth, fog, texture, specular reflectivity, and alpha ($\alpha$), are often used. These components can be used for blending, shading, or distance effects and are herein designated by the letter A. Vertex 0 is identified by a pixel with four components (R, G, B, A) and is designated $(RGBA)_0$. Vertex 1 is also identified by a pixel with four components (R, G, B, A) and is designated $(RGBA)_1$, as is vertex 2 by another pixel with four components (R, G, B, A) designated $(RGBA)_2$.

The gradient or slope of the red color component R with respect to the horizontal coordinate x is:

$$dR/dx = -\frac{(R1-R0) \cdot (Y2-Y0) - (R2-R0) \cdot (Y1-Y0)}{(X1-X0) \cdot (Y2-Y0) - (X2-X0) \cdot (Y1-Y0)}.$$

Likewise, the gradient or slope of the red color component R with respect to the vertical coordinate y is:

$$dR/dy = -\frac{(R1-R0) \cdot (X2-X0) - (R2-R0) \cdot (X1-X0)}{(X1-X0) \cdot (Y2-Y0) - (X2-X0) \cdot (Y1-Y0)}.$$

The x and y gradients of the green and blue color components (G, B) and texture and other components are calculated using the above equations but substituting the desired component for R. The color or texture of any pixel within the triangle can be calculated from a starting pixel, pixel 0, and the x and y gradients.

Color of Pixels Calculated from Gradients

FIG. 1B is a triangle drawing primitive divided into horizontal scan lines of pixels. Pixels are represented by the small x'es. When the triangle is rendered, the pixels on the horizontal scan lines are located at each integer x,y coordinate within the triangle. The uppermost pixel within the triangle, pixel 0, is chosen as the starting pixel for triangle walking. The x and y gradients of each color and texture component are used to find the component's interpolated value at each pixel location.

For example, pixel 4 is located directly beneath the starting pixel 0. Since it is directly beneath the starting pixel, the x gradient is multiplied by zero and can be ignored. Pixel 4 is located on the fourth horizontal line below pixel 0, so the red color R component of pixel 4 is R of pixel 0 added to four times the gradient of R with respect to y:

$$R_4 = R_0 + (4 * dR/dy).$$

When pixel 4 is closer to vertex 0 than to vertex 2, the color of pixel 4 is closer to the color of vertex 0. Likewise, pixels closer to vertex 1 are closer to the color of vertex 1 than to the color of vertex 0. Rounding is performed before edge-walking of the triangle.

FIG. 1C is a diagram showing span walking of the color of a pixel inside a triangle drawing primitive using both x and y gradients. In this example, pixel 5 is located beneath and to the right of the starting pixel 0. Since it is to the right of the starting pixel by two pixels, the x gradient is multiplied by two. Pixel 5 is located on the fourth horizontal line below pixel 0, so the red color R component of pixel 5 is R of pixel 0 added to four times the gradient of R with respect to y:

$$R_5 = R_0 + (2 * dR/dx) + (4 * dR/dy).$$

In practice, a triangle-walking scheme is used that steps through each pixel and each horizontal line. The x-gradient is added as each pixel is stepped through. The y-gradient is added when a new horizontal line begins. Interpolation based on triangle-walking is preferred because it uses additions rather than multiplications.

This triangle-walking-based interpolation is known as Gouraud shading. Gouraud shading can also use a specular color component that depends on the angle of viewing and of the light source. In addition to the standard R,G,B, each pixel can have specular components $R_s$, $G_s$, $B_s$. The image appears computer-generated when simple linear addition of the gradient is used without texture effects. Better-appearing techniques use textures such as texture maps.

Fog and Other Effects

Other special graphics effects also are interpolated. For example, a white fog may be superimposed over an object to give the illusion of a mist or fog between the viewer and the object. Objects farther from the viewer have more of the white fog and less of the object's color. The white fog could be replaced by another color, such as for a yellow mist, or this blending technique can be applied to blend two or more polygons for translucency or ghost effects.

A complex map of a texture can be mapped onto the polygon. Interpolation between four virtual pixels on a texture map is used in Bi-linear interpolation. The four closest values from a texture map are interpolated in each dimension to determine what color to render to the pixel. Different texture maps are stored for different resolutions (sizes) of polygons in level-of-detail (LOD) MIP-mapping. A third technique called "tri-linear MIP mapping" interpolates between four closest virtual pixels on the two closest texture maps for the polygon's resolution.

Sequential Nature of 3D Processing—FIG. 2

FIG. 2 is a flowchart of 3D-graphics processing on a PC. Triangles from the 3D-execute buffer are transformed or moved to simulate motion and to account for the user's perspective. Lighting sources are also applied to each triangle, step 20. In the triangle-rendering setup, step 22, the three vertices of the triangle are used to calculate the slopes or gradients with respect to x and y screen axis. The gradients of all color, depth, and texture attributes are determined. Triangle-walking step 24 determines the x,y coordinates for each pixel within the triangle. The x,y coordinate of each pixel is sent to color and depth interpolation step 26, and to texture interpolation step 28. The R,G,B,Z, and other non-texture components of the pixel are computed in step 26, while the texture maps are computed in step 28 for the pixel. The texture components from step 28 is combined with the color components from step 26 in blending step 30. The final blended pixel from step 30 is then written to the frame buffer for display on the screen, step 32.

All of the steps in FIG. 2 can be performed by software executing on the host processor. However, for host processors such as AMD's K6, National Semiconductor's 686, or Intel's Pentium™ processor, system and graphics performance suffers. A graphics accelerator can be used to improve performance. For example, the host CPU can still perform steps 20 and 22, while the graphics accelerator handles steps 24, 26, 28, and 30. The host processor can perform only the first step 20, or all steps except steps 26, 28, 30.

Parallel Operation on a Pixel Desirable

Ideally, both the host CPU and the graphics processor should operate on the same pixel to maximize performance by using both computational resources. For example, the host CPU could perform color interpolation step 26 on the color part of a pixel while the graphics hardware accelerator performs texture interpolation step 28 on the texture part of a pixel. For blending step 30 to occur without delay, the host CPU must complete step 26 at the same time that the graphics accelerator completes step 28.

In practice, synchronizing the host CPU and the graphics accelerator has made such parallel operation on a pixel difficult. CPU speeds vary, so the graphics accelerator that is synchronized for one CPU speed may lose synchronization for other CPU with different speeds. The CPU's current workload also affects its performance relative to that of the graphics accelerator hardware.

The partitioning of the steps between the software on the host processor and the graphics hardware accelerator is limited by the sequential nature of the steps. Earlier steps on a pixel must be completed before later steps on that pixel can begin. This sequential nature has prevented parallel operation of both the host processor and the graphics accelerator on the same pixel.

What is desired is to use both the host processor on a PC and a 3D-graphics accelerator to operate on the same pixel at the same time. Parallel operation on the same pixel at the same time by both the host processor and the graphics accelerator is desired. Parallel operation is desired to maximize the use of computational resources of the PC to improve 3D-graphics quality. Parallel operation is desired to reduce the expense of graphics-accelerator hardware by using the host processor to perform some of the triangle rendering operations in parallel.

SUMMARY OF THE INVENTION

A graphics accelerator operates in parallel with a host processor to render a triangle with a three-dimensional (3D) appearance including a 3D texture. The graphics accelerator has a gradient input connected to receive gradients of texture attributes from the host processor. The gradients are slopes with respect to x and y coordinate axes for the texture attributes in the triangle being rendered. A starting-point input is coupled to the host processor to receive a starting vertex of the triangle. The starting vertex includes x and y coordinates and values for the texture attributes at the starting vertex.

A triangle walker receives the starting vertex. It calculates x and y coordinates of pixels within the triangle by incrementing an x coordinate of a pixel on a horizontal line to generate a next pixel on the horizontal line, and by incrementing a y coordinate of a pixel to generate a next pixel on a next horizontal line.

A texture interpolator is coupled to the triangle walker. It interpolates the texture attributes for pixels within the triangle by adding a texture gradient with respect to x to the texture attributes for the pixel on the horizontal line to generate the texture attributes for the next pixel on the horizontal line. It also adds the texture gradient with respect to y to the texture attributes of the pixel to generate the texture attributes for a next pixel on the next horizontal line.

A texture-attribute converter is coupled to receive the texture attributes for each pixel within the triangle. It converts the texture attributes for each pixel to a texture-map coordinate on a texture map. A texture map is coupled to the texture-attribute converter. It contains a matrix of texture pixels accessed by the texture-map coordinate. The texture map outputs a texture pixel when accessed by the texture-map coordinate.

A non-texture pixel input is coupled to the host processor. It receives color pixels within the triangle. The color pixels have no texture attributes. A color pixel is generated by 3D software executing on the host processor in parallel with the graphics accelerator.

A blender is coupled to receive the texture pixel from the texture map and the color pixel from the host processor. Both the texture pixel and the color pixel have a same x and y coordinate within the triangle. The blender combines the texture pixel with the color pixel to produce a composite pixel for the same x and y coordinate.

A pixel output is coupled to the blender. It outputs the composite pixel to a frame buffer for display on a screen to a user. Thus the 3D software on the host processor generates the color pixel when the graphics accelerator generates the texture pixel for the same x and y coordinate within the triangle is rendered. The 3D software and the graphics accelerator operate in parallel on a same pixel.

In further aspects of the invention the host processor does not send the x and y coordinates of each pixel within the triangle to the graphics accelerator. The host processor sends the color pixel and depth to the graphics accelerator for each pixel within the triangle. However, the host processor sends the starting vertex and gradients to the graphics accelerator only at a start of a new triangle and not for every pixel within the triangle. Thus the gradient input receives data only once per triangle while the non-texture pixel input transfers many pixels per triangle.

In still further aspects the texture attributes include u,v and rhw attributes. The texture-attribute converter divides u and v by rhw for the pixel to generate the texture-map coordinate on the texture map. Thus the texture-map coordinates are non-linear.

In further aspects the triangle walker continues to increment the x coordinate and the interpolator continues to add the texture gradient to the texture attributes until all texture pixels in a current triangle are generated. Thus the triangle walker in the graphics accelerator is synchronized on triangle level with the 3D software executing on the host processor.

In further aspects the texture pixel has a red, a green, and a blue component. The color pixel has a red, a green, and a blue component. The blender adds a fraction of the red component of the texture pixel to a fraction of the red component of the color pixel to generate a red component of the composite pixel, and the blue and green components are likewise combined by the blender.

DETAILED DESCRIPTION

The present invention relates to an improvement in 3D-graphics processing. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventor has realized that performance of 3D rendering can be improved if both the host processor and the graphics-accelerator hardware can operate on the same pixel at the same time. This parallel operation on a 3D pixel can lead to less expensive graphics-accelerator hardware for a desired 3D performance.

Figure 3:
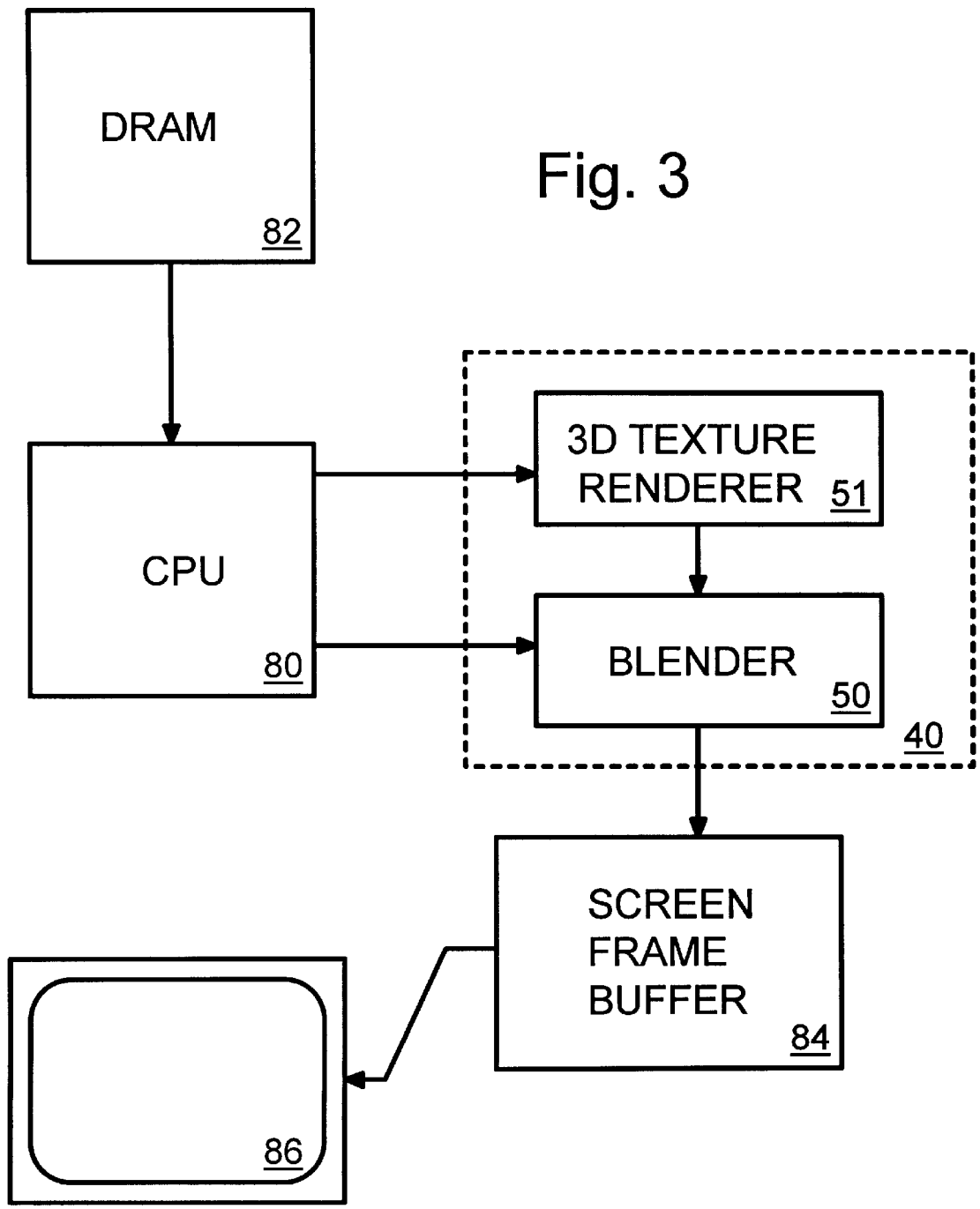
FIG. 3 is a diagram of a personal computer (PC) with a 3D graphics-accelerator that operates in parallel on the same pixel with the host processor.

FIG. 3 is a diagram of a personal computer (PC) with a 3D graphics-accelerator that operates in parallel on the same pixel with the host processor. Color and depth interpolation is performed for a pixel by the host processor while texture interpolation for the same pixel is performed by the graphics-accelerator hardware. The host processor or central processing unit (CPU) 80 is the main microprocessor such as AMD's K6 or Intel's Pentuim™. CPU 80 is used to execute user programs and operating-system routines. CPU 80 also executes 3D-graphics software that performs some of the steps of manipulating and rendering 3D objects. The 3D-graphics software may include O/S routines that comply with Microsoft's Direct3D standard or the OpenGL standard so that application programs can use a uniform standard of API routines to access 3D capabilities.

A 3D-execute buffer is established in DRAM main memory 82. Object surfaces are represented as triangle vertexes in the 3D-execute buffer. CPU 80 writes new objects to memory 82 and updates these objects by transforming the coordinates of the three vertices of each triangle to simulate motion of the objects. The perspective of the viewer is also used to transform the vertices of the triangles, and the angle of the light source is used to adjust color for shading effects.

After transformation and lighting by software on CPU 80, each triangle is interpolated to determine the pixel color, depth, and texture for each pixel within the triangle. The pixels are then written to frame buffer 84 for display to a user on screen 86, Frame buffer 84 is essentially a bitmap of all horizontal lines of pixels on the screen. As screen 86 is rasterized, pixels are fetched in order from frame buffer 84 and written to screen 86. Screen 86 can be a conventional CRT monitor or a flat-panel display for a portable PC.

The slopes or gradients of the color components R,G, B, and texture and other effects components are first calculated by CPU 80 based on their values for the three vertices of the triangle. Rather than immediately calculate the x,y coordinates of each actual pixel within the triangle, CPU 80 sends the texture-component gradients to texture renderer 51 in graphics accelerator 40. One of the three vertices is also sent as a starting vertex for the triangle-walking.

Texture renderer 51 then uses the starting vertex and the gradients of the texture components to perform a triangle-walking for just the texture components. The x and y coordinates and the texture of each pixel within the triangle is determined as the sequence of triangle-walking proceeds.

CPU 80 performs its own triangle-walking, determining the x,y coordinates and the R,G,B, alpha, fog, specular R,G,B components, and depth Z for each pixel within the triangle. Texture renderer 51 and CPU 80 are synchronized so that they output components for the same pixel at the same time to blender 50. Blender 50 in graphics accelerator 40 then mixes the texture and color components for the pixel and writes the pixel to frame buffer 84.

Thus CPU 80 and texture renderer 51 operate on the same pixel in parallel. Both perform triangle-walking: CPU 80 performs triangle-walking for the color and depth components, while texture renderer 51 performs triangle walking for the texture components.

Both CPU 80 and texture renderer 51 perform their own triangle walking to determine the pixel locations within the triangle. Having both perform triangle-walking in parallel allows for better synchronization of the generation of color and depth and texture attributes of pixels. Performing triangle-walking in parallel eliminates the transfer of triangle-walking results such as pixel x,y locations. This reduces the bandwidth required of external busses.

Blender 50 is preferably integrated onto the same silicon substrate as texture renderer 51 to reduce chip count and costs. Graphics accelerator 40 can then be sold as a single chip that cooperatively operates in parallel with the PC's host CPU.

Figure 4:
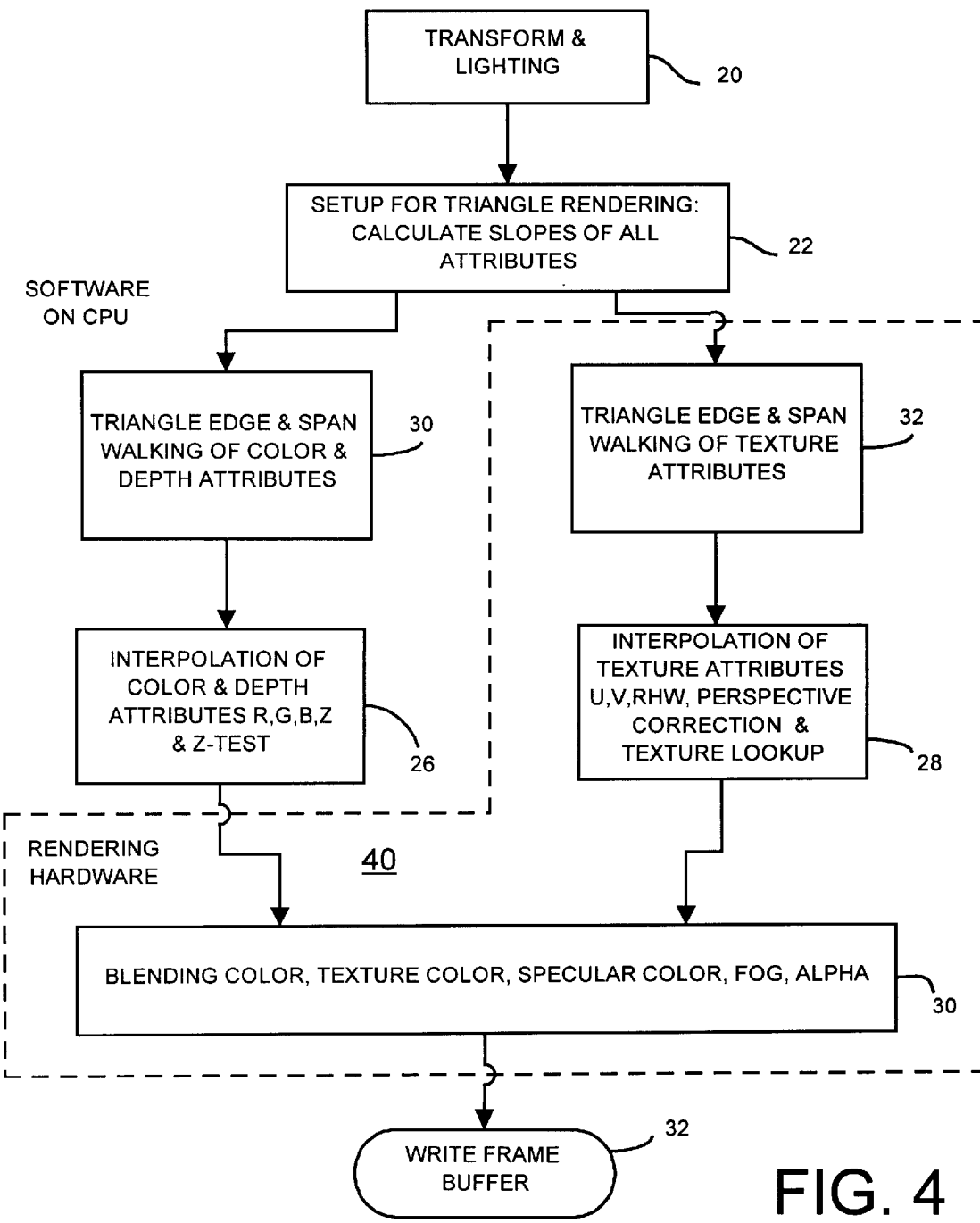
FIG. 4 is a flowchart of manipulating and rendering 3D triangles using the host processor in parallel with a graphics hardware-accelerator.

Triangle-Walking Performed in Parallel—FIG. 4

Figure 1A:
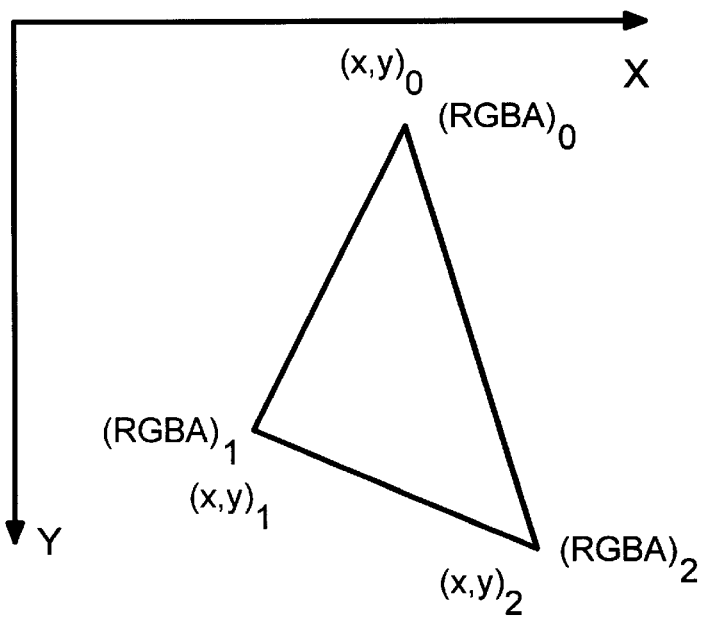
FIG. 1A is a diagram of a triangle that is a drawing primitive of a 3D object or surface.
Figure 1B:
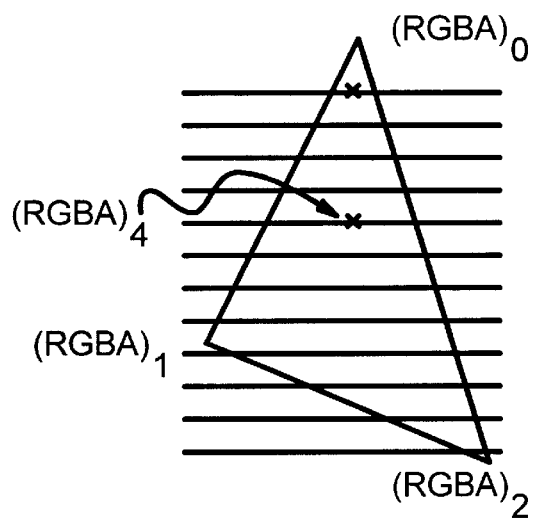
FIG. 1B is a triangle drawing primitive divided into horizontal scan lines of pixels.
Figure 1C:
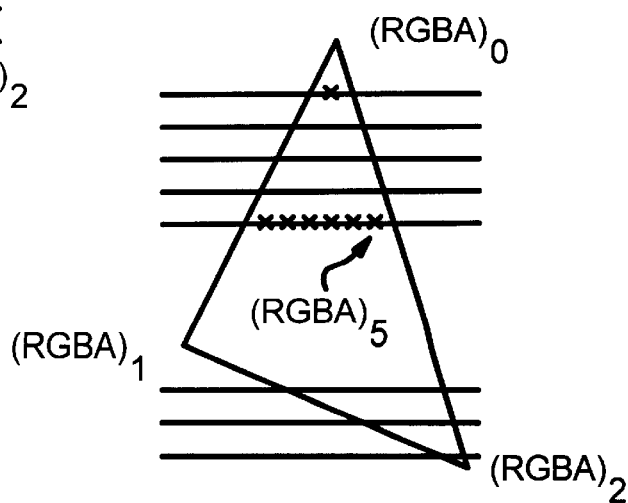
FIG. 1C is a diagram showing span walking of the color of a pixel inside a triangle drawing primitive using both x and y gradients.
Figure 2:
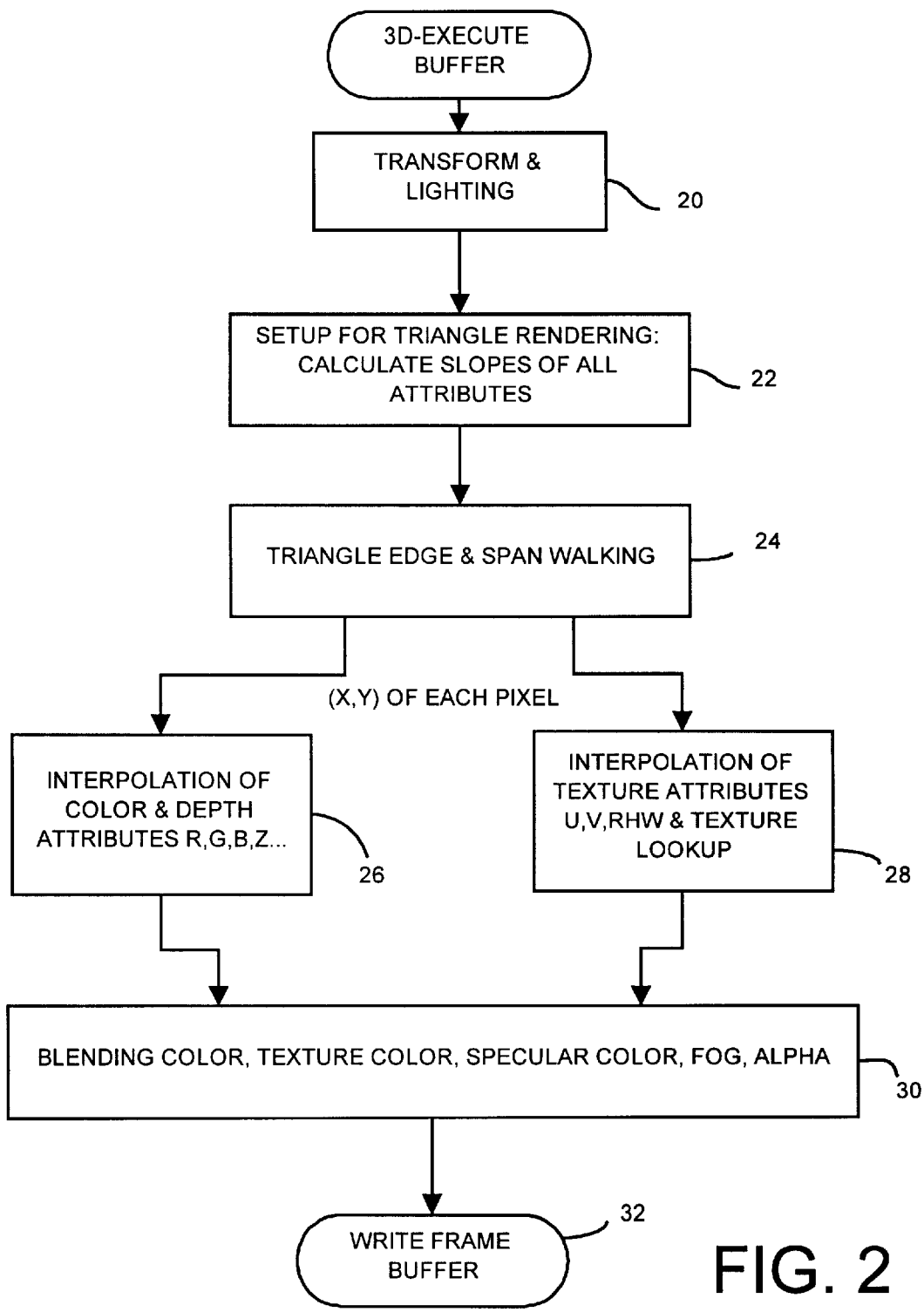
FIG. 2 is a flowchart of 3D-graphics processing on a PC.

FIG. 4 is a flowchart of manipulating and rendering 3D triangles using the host processor in parallel with a graphics hardware-accelerator. In comparison to FIG. 2, the triangle-walking step 24 is now split into two parallel steps: triangle-walking is performed for color and depth components in the host CPU in step 30, while triangle-walking is also performed for texture components in step 32.

Performing triangle-walking twice in parallel seems redundant and unnecessary to the ordinary person; however, the inventor has realized that higher performance can be achieved because pixel x,y coordinates from triangle-walking do not have to be transmitted over external busses. The interpolation steps for color, depth, and texture components thus are more readily coordinated when performed on different chips in the PC. Also, triangle-walking can be more tightly integrated with the interpolation steps performed in the CPU and especially in the graphics accelerator hardware. In particular, triangle-walking step 32 for texture components can be tightly integrated with texture interpolation step 28 as is explained in detail later. Triangles from the 3D-execute buffer are transformed or moved to simulate motion and to account for the user's perspective. Lighting sources are also applied to each triangle by the host CPU, step 20. In the triangle-rendering setup, step 22, the host CPU uses the three vertices of the triangle to calculate the slopes or gradients with respect to x and y screen axis. The gradients of both color and texture components or attributes are determined.

The color and depth gradients remain in the CPU for color and depth triangle-walking step 30 and color and depth interpolation step 26 by the host CPU, while the texture gradients and the starting vertex and its texture attributes are sent from the host CPU to graphics accelerator 40. These texture gradients are then used by graphics accelerator 40 to perform texture triangle-walking step 32 and texture interpolation and lookup step 28. The texture attributes for each pixel include the coordinates on the texture map, known as coordinates u,v. Another texture attribute is rhw, the reciprocal of w the homogeneous coordinate. The homogeneous coordinate w is a scaled version of depth Z. Scaling Z depths result in homogeneous components. Rhw is used to add perspective to the texture map. At the three vertexes, the texture coordinate is multiplied by rhw to generate a scaled u,v coordinate. Scaling by rhw adds perspective to the texture. Once the scaled u,v coordinates and rhw are calculated for a pixel, the scaled u,v coordinates are divided by rhw to obtain the final u,v coordinate. Then the u,v location on the texture map is read to fetch the pixel's texture. The fetched texture has red, green, and blue components designated as $R_T$, $G_T$, $B_T$.

The texture components from step 28 are combined with the CPU-generated color components from step 26 in blending step 30. Blending step 30 is performed by the graphics accelerator 40. The final blended pixel from step 30 is then written to the frame buffer for display on the screen, step 32.

Figure 5:
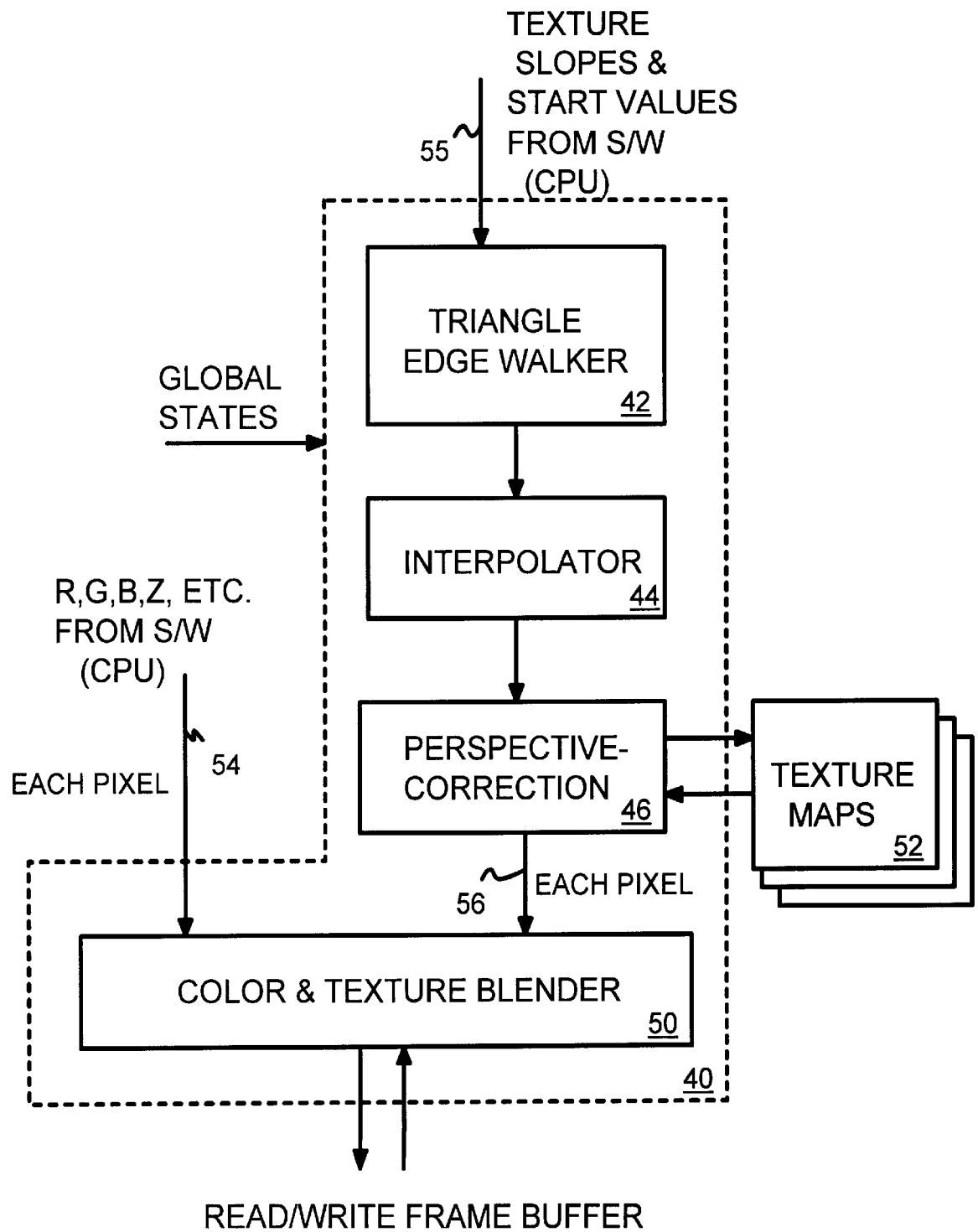
FIG. 5 is a diagram of a hardware 3D-graphics accelerator that performs texture triangle-walking in parallel with color software on a CPU.

Texture Rendering Hardware—FIG. 5

FIG. 5 is a diagram of a hardware 3D-graphics accelerator that performs texture triangle-walking in parallel with 3D-graphics software on a CPU. The 3D software that is executing on the host CPU calculates the gradients or slopes of texture-related attributes scaled u,v, and rhw. The scaled u,v and rhw are linearly interpolated across the triangle and then a correction is used before accessing the texture map. The correction required a division operation.

The starting values of the texture-related attributes and their slopes with respect to x and to y are generated and sent from the CPU to graphics accelerator 40. The starting vertex of the triangle being rendered is also sent, as are the slopes of the edges of the triangles for calculating the endpoints of each horizontal line of pixels (a span).

Triangle edge walker 42 uses the starting vertex and the gradients to sequentially walk down the edges of the triangle and across each span or horizontal line of pixels. The endpoints of a span are calculated by adding the gradients or slopes of the edges to the starting vertex. Then the span is walked. To begin walking the span, one of the endpoints is rounded inward to the nearest actual pixel. Then interpolator 44 calculates the value of texture attributes for the pixel.

For the next pixel in the span, interpolator 44 adds the gradients of u,v, and rhw with respect to x to the last values of u,v, and rhw. The gradients of u,v, and rhw with respect to x are added again for the next pixel. The du/dx, dv/dx, and drhw/dx gradients continue to be added for each pixel in the span until the last pixel is reached. Edge walker 42 can be used to determine the number of pixels in the current span.

The endpoints of the next span are calculated by edge walker 42 by again adding the gradients of x with respect to y to the last span's endpoints. As each pixel's u,v and rhw is interpolated by interpolator 44, then a correction for non-linear perspective is applied by perspective-correcting logic 46. The correction applied by logic 46 is to divide the u and v coordinates by rhw.

A texture element or texel at the location u,v in texture maps 52 is read by logic 52. Bus 56 sends the texel read from texture maps 52 to blender 50. The texel has read, green, and blue components ($R_T$, $G_T$, $B_T$). Using texture maps 52 and the reciprocal of rhw allows the texture to vary in a non-linear perspective-corrected manner.

The host CPU's software performs its own triangle edge and span walking and calculates R,G,B, depth Z, blending attribute alpha, fog, and specular components $R_s$, $G_s$, $B_s$. Specular components provide a shininess to a surface that depends on the angles of the light source and the viewer to the triangles normal vector. These color components from the host CPU are sent on a pixel-by-pixel basis over bus 54 to blender 50 in graphics accelerator 40.

The color pixel from the host CPU arrives on bus 54 at the same time that the texture pixel from graphics accelerator 40 arrives on bus 56 at blender 50. Blender 50 then blends the color pixel from the CPU software with the texture pixel from the graphics accelerator hardware and outputs the final pixel to the frame buffer for viewing.

Global states are also loaded from the host CPU to graphics accelerator 40. These global states include a texture wrapping mode (such as tiling or mirror or clamp modes) for when the triangle is larger than the texture map. A texture modulation mode is use to vary the texture by multiplying, adding, or copying for special effects. Fog colors are also sent to blender 50 and loaded into fog registers for use with all pixels in the triangle being rendered. The texture maps and texture palette are also loaded into graphics accelerator 40. Different resolutions of texture maps are often loaded for different triangles, depending on the Z depth of the triangle. These global states are constant for all pixels in a triangle, and usually for many or all triangles displayed.

Two Data Rates—Triangle and Pixel Rates

The gradients and starting vertex are loaded to the graphics accelerator only once for each triangle. Thus bus 55 operates at a relatively low bandwidth—new data is sent only for new triangles, not for each pixel in the triangle. In contrast, busses 54, 56 operate a high bandwidth, since new data is transmitted to blender 50 for each pixel. Thus data is entered into graphics accelerator 40 at two very different rates: a slower triangle rate and a faster pixel rate.

Figure 6:
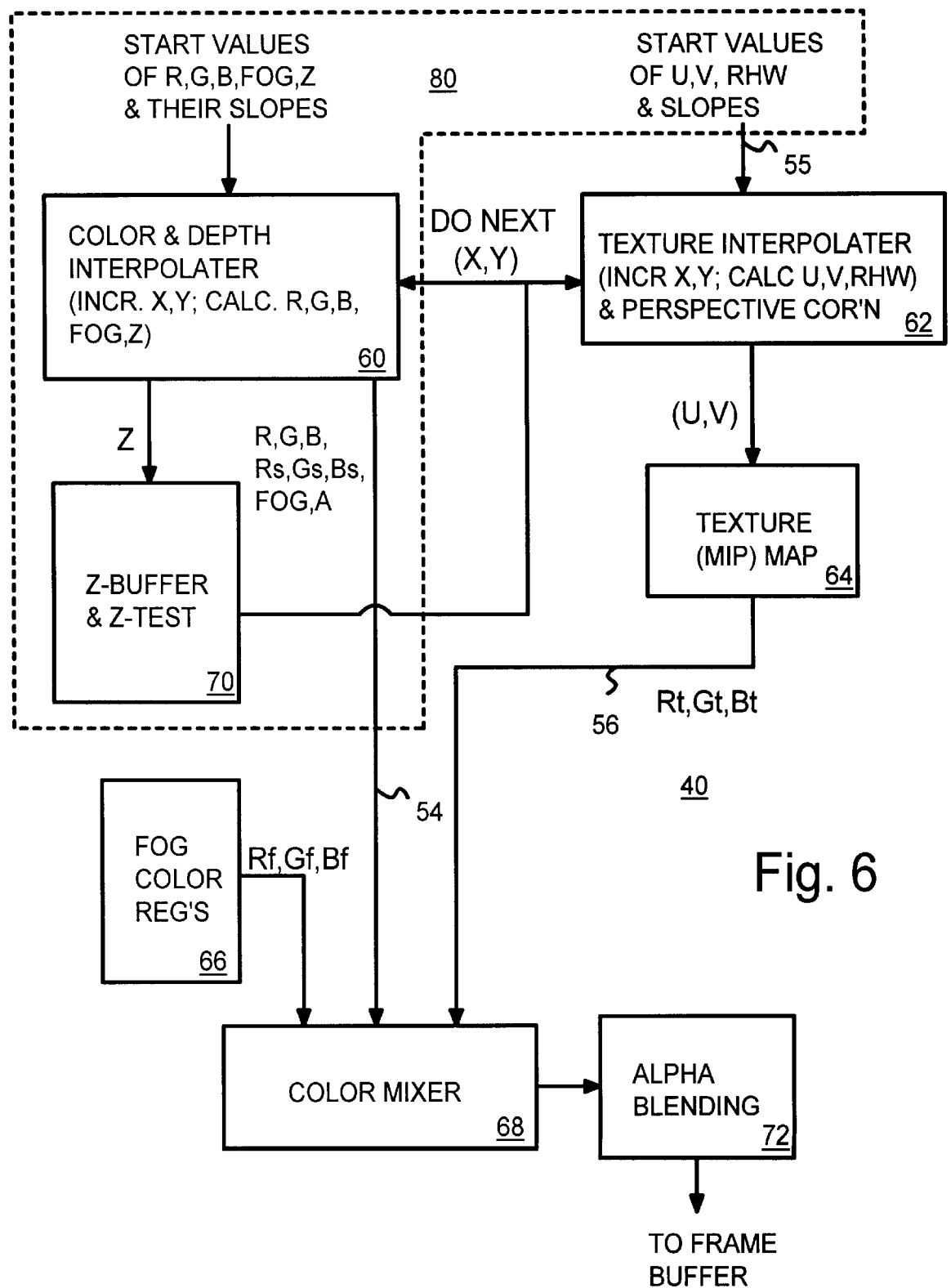
FIG. 6 is a diagram highlighting how the CPU software and the graphics accelerator are pixel-synchronized.

Pixel-Synchronized CPU and Graphics Accelerator—FIG. 6

FIG. 6 is a diagram highlighting how the CPU software and the graphics accelerator are pixel-synchronized. The CPU's software generates the gradients of the texture and non-texture (color and depth) attributes. The color and depth components remain in the CPU are used by CPU software-interpolator 60 for triangle walking and interpolation. Software-interpolator 60 outputs the R,G,B, alpha, fog, Z, and specular R,G,B components for each pixel on bus 54 to mixer 68.

Texture gradients and starting values from the CPU are sent to graphics accelerator 40 where hardware interpolator 62 performs triangle edge and span walking, generating the linearly-interpolated texture components for each pixel. The scaled u,v coordinate of the pixel is divided by the rhw component for that pixel to obtain the final u,v coordinate for the texture map. The final u,v coordinate is used as an address or index into texture map 64, which then outputs the texture stored at location u,v.

The $R_T$, $G_T$, $B_T$ texel components from texture map 64 is sent on bus 56 to mixer 68 for each pixel. The fog factor is sent to mixer 68. The fog color $R_F$, $G_F$, $B_F$ from fog registers 66 are also sent to mixer 68. Mixer 68 then mixes the fog pixel from fog registers 66, the flat color R,G,B from bus 54, the specular color $R_s$, $G_s$, $B_s$ also from bus 54, and the texel $R_T$, $G_T$, $B_T$ from bus 56 to produce a composite pixel with composite components R,G,B. The depth Z from software-interpolator 60 is sent to Z-test logic with Z-buffer 70, where the Z depth is compared to the value in the Z-buffer at that x,y coordinate of the pixel. If another pixel already in Z-buffer 70 has a smaller depth Z, then the composite pixel from mixer 68 is hidden by another pixel in Z-buffer 70 and is not displayed.

Otherwise, the Z depth is written to Z-buffer 70. Then the composite pixel from mixer 68 is sent to alpha-blender 72. The alpha component specifies the relative weight of the composite pixel. Alpha-blending allows for ghosting and translucent effects. Anti-aliasing of edge pixels can also be performed here. The final pixel from alpha-blender 72 is written to the fame buffer for display to the user.

Mixer Regulates Flow of Pixels From Both CPU Software & Graphics Hardware

Triangle span walking by the CPU and the graphics accelerator are pipelined together into mixer 68. Since mixing cannot occur until both texel and color pixels are received from busses 56, 54, mixer 68 waits for both pixels to be received before continuing. Thus mixer 68 naturally regulates the flow of pixels from both the CPU software and the graphics accelerator hardware.

When the color pixel from bus 54 and the texel from bus 56 are both received by mixer 68, a new pixel can be interpolated by both the CPU and the graphics accelerator. Software-interpolator 60 and hardware-interpolator 62 both wait for next-pixel signal 71 before interpolating the next pixel in the triangle.

Rather than generate next-pixel signal 71 directly from mixer 68, next-pixel signal 71 is preferably generated from Z-buffer 70. Z-buffer 70 is stored in the DRAM main memory and requires the CPU to perform a memory access. Mixer 68 is instead a hardware block in graphics accelerator 40. Thus it is preferably to have the CPU software generate next-pixel signal 71 rather than the graphics hardware accelerator. The CPU also performs the Z-buffer test, eliminating the cost of a dedicated Z-buffer.

The next-pixel signal can be eliminated. Triangle-walking can continue in parallel in the CPU and the dedicated hardware until the triangle is completed. When one of the components but not the other arrives at mixer 68, then mixer 68 waits until the other component arrives. A FIFO buffer may also be used.

Figure 7:
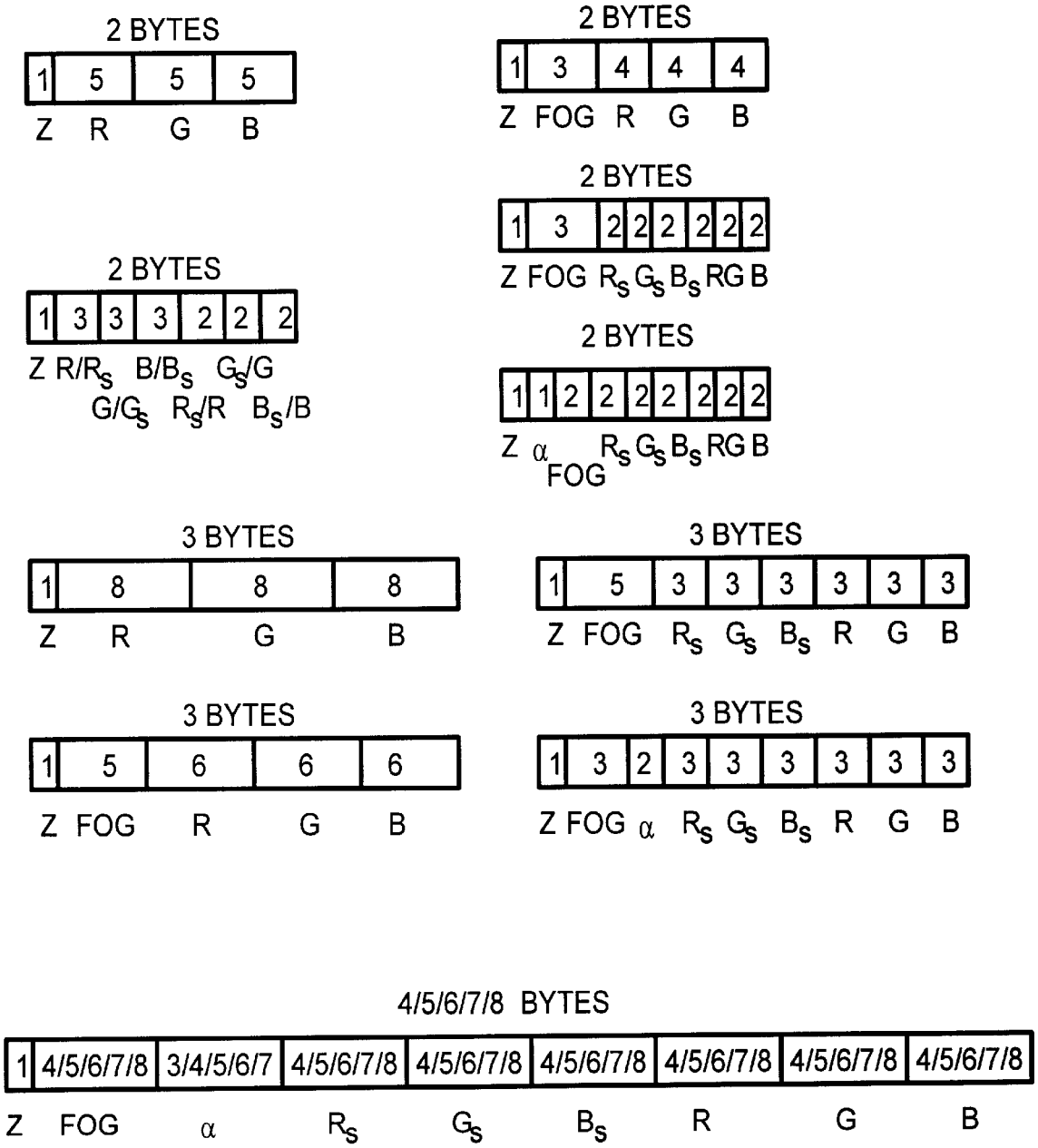
FIG. 7 shows some of the data formats for color pixels without texture attributes that are sent from the CPU software to the mixer in the graphics accelerator.

FIG. 7 shows some of the data formats for color pixels and depth without texture attributes that are sent from the CPU software to the mixer in the graphics accelerator. All formats have R,G,B and Z-depth fields. Some formats have a fog field to identify one of the fog registers. Other formats have the specular components $R_s$, $G_s$, $B_s$. Alpha is also used for some of the larger formats. The formats range from 2 to 8 bytes per color pixel. The 1-bit Z-depth field indicates when the pixel is visible.

Details of Triangle Edge and Span Walking

More details of the equations implemented for triangle edge and span walking, and attribute interpolation are given in this section. Assume that gradients of x with respect to y for the three edges of the triangle are:

X1y, X2y, X3y.

The height in y from the top vertex to the middle vertex is H1 while the height from the middle vertex to the bottom vertex is H2. For edge walking to determine the x,y coordinates of the endpoints of each horizontal line or span, the x,y or the top vertex, H1, H2, and X1y, X2y, X3y are sent from the CPU as starting values.

For span walking and color interpolation, the gradients of R, G, B, Z, alpha $\alpha$, etc. with respect to x and y are also needed from the CPU software:

Rx, Gx, Bx, Zx, $\alpha$x, etc.

Their gradients with respect to y are:

Ry, Gy, By, Zy, $\alpha$y, etc.

Edge walking starts from the top vertex, at coordinate (X0, Y0) with color attribute values of R0, G0, B0, Z0, A0, etc.

Step 1. Increment y: Y0+1

Calculate the left-edge endpoint of the first span:

x: X0+X1y (X1y is negative in this example)

Calculate right-edge endpoint x: X0+X3y

Calculate left-edge R color attribute:

R=R0+(Ry+X1y·Rx)

Similarly, calculate other values for G,B,Z,$\alpha$, etc.

Step 2. Start from X=X0+X1y:

X=X+1, . . . , until X reaches X0+X3y.

For each X, calculate the new R by adding Rx to the old R:

R=R+Rx, . . .
3. Increment y:
Y0+1+1
Calculate left edge x:
X0+X1y+X1y
Calculate right edge x:
X0+X3y+X3y
Calculate left edge R:
R=R0+(Ry+X1y·Rx)+(Ry+X1y·Rx)
Similarly, calculate other values. . . . ,
Step 4. Start from X=X0+X1y+X1y:
X=X+1, . . . , until X reaches X0+X3y+X3y
For each X, calculate the new R by adding Rx to old R:
R=R+Rx, . . .
Similar calculations are performed for Steps 5–8. Then X2y is used instead of X1y for Steps 10–12.

Advantages of the Invention

Performing triangle-walking twice in parallel no doubt appears redundant and unnecessary to the ordinary person. Surprisingly, the inventor has realized that higher performance can be achieved because the interpolation steps for color and texture components can more readily be coordinated when performed on different chips or sub-systems in the PC. Also, triangle-walking can be more tightly integrated with the interpolation steps performed in the CPU and especially in the graphics accelerator hardware. In particular, the triangle-walking step for texture components can be tightly integrated with the texture interpolation step in the graphics accelerator.

Performing triangle-walking in parallel eliminates the transfer of triangle-walking results such as pixel x,y locations. This reduces the bandwidth required of external busses.

Color and depth interpolations use ADD operations, which are quickly executed on the host CPU. Texture interpolations and blending use division and multiply operations that are considerably slower on the host CPU than ADD operations. Thus the invention significantly accelerates texture operations that are slow to execute on the host CPU without the expense of graphics-acceleration hardware for non-texture interpolations that are already efficiently performed on the host CPU.

The invention uses minimal additional hardware to accelerate only the complex texture interpolations to get a significant performance gain. Portable and hand-held PC's are sensitive to additional hardware and cost and thus are ideal for the hybrid approach of the invention.

Alternate Embodiments

Several other embodiments are contemplated by the inventor. For example various implementations of the graphics accelerator hardware are possible. The texture map can be separate from the graphics accelerator or integrated onto the same silicon substrate as the graphics accelerator. Polygons other than triangles can be used as drawing primitives with the invention.

Buffers such as FIFO's can be added to allow portions of the 3D pipeline to operate at slightly different momentary rates. The inputs to the graphics accelerator can use separate busses or can share a bus to the processor, such as a shared PCI or advanced-graphics-port (AGP) bus.

Other 3D effects can be used with the invention. Anti-aliasing removes jagged lines at the edge of a polygon by blending pixels at the edge of the polygon. The polygon's color is blended with a background color so that the polygon's edge gently blends into the background rather than abruptly changes. For fog, the blending factor is the adjusted distance of the polygon to the viewer. The color of the polygon is blended with white. Bilinear interpolation blends the two closest texture-map pixels in each dimension, using the fractional distance as the blending factor.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A graphics accelerator for operating in parallel with a host processor to render a triangle with a three-dimensional (3D) appearance including a 3D texture, the graphics accelerator comprising:

a gradient input, connected to receive gradients of texture attributes from the host processor, the gradients being slopes with respect to x and y coordinate axes for the texture attributes in the triangle being rendered;

a starting-point input, coupled to the host processor, for receiving a starting vertex of the triangle, the starting vertex including x and y coordinates and values for the texture attributes at the starting vertex;

a triangle walker, receiving the starting vertex, for calculating x and y coordinates of pixels within the triangle by incrementing an x coordinate of a pixel on a horizontal line to generate a next pixel on the horizontal line, and by incrementing a y coordinate of a pixel to generate a next pixel on a next horizontal line;

a texture interpolator, coupled to the triangle walker, for interpolating the texture attributes for pixels within the triangle by adding a texture gradient with respect to x to the texture attributes for the pixel on the horizontal line to generate the texture attributes for the next pixel on the horizontal line, and by adding the texture gradient with respect to y to the texture attributes of the pixel to generate the texture attributes for a next pixel on the next horizontal line;

a texture-attribute converter, coupled to receive the texture attributes for each pixel within the triangle, for converting the texture attributes for each pixel to a texture-map coordinate on a texture map;

a texture map, coupled to the texture-attribute converter, containing a matrix of texture pixels accessed by the texture-map coordinate, the texture map outputting a texture pixel when accessed by the texture-map coordinate;

a non-texture pixel input, coupled to the host processor, for receiving color pixels within the triangle, the color pixels having no texture attributes, a color pixel generated by 3D software executing on the host processor in parallel with the graphics accelerator;

a blender, coupled to receive the texture pixel from the texture map and the color pixel from the host processor, both the texture pixel and the color pixel having a same x and y coordinate within the triangle, the blender for combining the texture pixel with the color pixel to produce a composite pixel for the same x and y coordinate; and a pixel output, coupled to the blender, for outputting the composite pixel to a frame buffer for display on a screen to a user, whereby the 3D software on the host processor generates the color pixel when the graphics accelerator generates the texture pixel for the same x and y coordinate within the triangle being rendered, whereby the 3D software and the graphics accelerator operate in parallel on a same pixel.

2. The graphics accelerator of claim 1 wherein the triangle walker in the graphics accelerator and the 3D software executing on the host processor both generate the x and y coordinates for the same pixel on a same horizontal line within a same triangle, whereby triangle walking is performed in parallel by both the 3D software on the host processor and by the graphics accelerator.

3. The graphics accelerator of claim 2 wherein the host processor does not send the x and y coordinates of each pixel within the triangle to the graphics accelerator.

4. The graphics accelerator of claim 3 wherein the host processor sends the color pixel and depth to the graphics accelerator for each pixel within the triangle, but the host processor sends the starting vertex and gradients to the graphics accelerator only at a start of a new triangle and not for every pixel within the triangle, whereby the gradient input receives data only once per triangle while the non-texture pixel input transfers many pixels per triangle.

5. The graphics accelerator of claim 4 wherein:

the texture attributes comprise u,v and rhw attributes, the texture-attribute converter divides u and v by rhw for the pixel to generate the texture-map coordinate on the texture map, whereby the texture-map coordinates are non-linear.

6. The graphics accelerator of claim 5 wherein a different texture map is used for different triangles having different numbers of pixels.

7. The graphics accelerator of claim 4 wherein the triangle walker continues to increment the x coordinate and the interpolator continues to add the texture gradient to the texture attributes until all texture pixels in a current triangle are generated, whereby the triangle walker in the graphics accelerator is synchronized on triangle level with the 3D software executing on the host processor.

8. The graphics accelerator of claim 4 wherein the texture pixel has a red, a green, and a blue component, and wherein the color pixel has a red, a green, and a blue component, wherein the blender adds a fraction of the red component of the texture pixel to a fraction of the red component of the color pixel to generate a red component of the composite pixel, and wherein the blue and green components are likewise combined by the blender.

9. The graphics accelerator of claim 8 wherein the color pixel also includes a fog factor for a fog color to be blended into the composite pixel by the blender, the color pixel also having red, green, and blue specular components that vary with an angle of a light source and an angle of a viewer to the triangle, whereby the color pixel from the host processor includes special effects other than surface-texture effects.

10. A personal computer (PC) for displaying graphics images with a three-dimensional 3D effect, the PC comprising:

a host processor for executing user programs and general-purpose application programs, the host processor also executing a 3D-graphics rendering program;

a main memory, coupled to the host processor, the main memory including a 3D-execute buffer containing 3D objects having triangles, each triangle having three vertices having color, depth, and texture components, the three vertices including a starting vertex;

wherein the 3D-graphics program generates spatial coordinates of each pixel within the triangle being rendered;

a frame buffer for storing pixels for display on a screen to a user;

a graphics accelerator, coupled to the host processor and coupled to the frame buffer, for receiving the starting vertex of a triangle being rendered, the graphics accelerator including:

a triangle walker for generating spatial coordinates of each pixel within the triangle from the starting vertex and for generating a texture attribute for each pixel;

a texture map being accessed by the texture attribute for each pixel within the triangle, the texture map outputting a texel for each pixel within the triangle, the texels having a textured appearance for a surface of the triangle;

a blender, receiving the texel from the texture map and receiving a non-textured pixel from the host processor, the blender combining the texel with the non-textured pixel to produce a composite pixel, the blender writing the composite pixel to the frame buffer when the composite pixel is not hidden; and depth control logic, in the host processor, receiving a depth component from the host processor for the non-textured pixel, for determining when the composite pixel is hidden by another 3D object, the depth control logic preventing the blender from writing the composite pixel to the frame buffer when the composite pixel is hidden, whereby the graphics accelerator generates the spatial coordinates of each pixel within the triangle and the host processor also generates the spatial coordinates of each pixel with the triangle, the graphics accelerator and the host processor operating in parallel on a same pixel at a same time.

11. The personal computer of claim 10 wherein the host processor includes software means for performing transformation and lighting routines on the triangles stored in the 3D-execute buffer in the main memory.

12. The personal computer of claim 11 wherein the host processor further includes triangle-setup means for generating texture gradients of the texture attribute with respect to x and y spatial coordinates, the host processor including setup means for sending the texture gradients to the graphics accelerator at the start of a new triangle for rendering, whereby the texture gradients are generated by software but used by the graphics accelerator.

13. The personal computer of claim 12 wherein the non-textured pixel from the host processor includes regular red, green, and blue (R,G,B) color components and specular R,G,B components that depend on an angle of a normal for the triangle to a user and an angle of the normal for the triangle to a light source, the specular R,G,B components adding a shininess effect to the non-textured pixel, whereby specular effects are generated by the host processor but texture effects are generated by the graphics accelerator.

14. The personal computer of claim 13 wherein:

the texture attribute are u,v and rhw attributes, the graphics accelerator divides u and v by rhw for the pixel to generate an address for accessing the texture map, whereby the texture attribute is non-linear.

15. The personal computer of claim 14 wherein the host processor and the graphics accelerator each generate the spatial coordinates of the pixels within the triangle by incrementing x and y coordinates.

16. A method of rendering a triangle with a three-dimensional (3D) appearance using graphics software executing on a host processor operating in parallel with a texture processor, the method comprising the steps of:

performing transformations of 3D objects composed of triangles, the transformations
for simulating motion of the 3D objects in relation to a perspective of a viewer;

reading imaginary pixels at three vertexes of a triangle to be rendered to a display screen;

generating edge gradients of edges of the triangle and generating color gradients, depth gradients, and texture gradients from the imaginary pixels at the three vertexes of the triangle;

sending one of the three vertexes as a starting vertex to the texture processor along with the texture gradients and the edge gradients;

successively generating, in the texture processor, pixel locations on spans within the triangle by starting at the starting vertex and successively incrementing an x coordinate or a y coordinate by one and successively adding the texture gradients to a texture attribute of the starting vertex to generate texture attributes for each pixel location within the triangle;

reading a texture pixel from a texture map using the texture attribute to identify the texture pixel within the texture map;

successively generating, in the host processor, pixel locations on spans within the triangle by starting at the starting vertex and successively incrementing an x coordinate or a y coordinate by one and successively adding the color gradients to a color attribute of the starting vertex to generate color attributes for each pixel location within the triangle;

outputting from the host processor the color attributes for each pixel location within the triangle; and blending the color attributes from the host processor with the texture pixel from the texture processor to generate a composite pixel for display on the display screen, whereby pixel locations are generated by the host processor and by the texture processor.

17. The method of claim 16 further comprising the steps of:

checking with the edge gradients, in both the host processor and in the texture processor, to determine when a pixel falls outside the triangle;

incrementing the y coordinate rather than the x coordinate when the pixel falls outside the triangle to begin a new span within the triangle, whereby triangle edge checking is performed in both the host processor and in the texture processor.

18. The method of claim 17 wherein the step of successively generating in the host processor further comprises:

successively adding the depth gradients to a depth attribute of the starting vertex to generate depth attributes for each pixel location within the triangle.

* * * * *